United States Patent
Boehme et al.

(10) Patent No.: US 10,091,354 B1
(45) Date of Patent: Oct. 2, 2018

(54) TRANSCRIBING MEDIA FILES

(71) Applicant: Sorenson IP Holdings, LLC, Salt Lake City, UT (US)

(72) Inventors: Kenneth Boehme, South Jordan, UT (US); Shane Roylance, Farmington, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

(21) Appl. No.: 15/380,589

(22) Filed: Dec. 15, 2016

(51) Int. Cl.
*H04M 11/00* (2006.01)
*H04M 3/42* (2006.01)

(52) U.S. Cl.
CPC .... *H04M 3/42391* (2013.01); *H04M 2201/60* (2013.01); *H04M 2203/4527* (2013.01); *H04M 2203/4581* (2013.01)

(58) Field of Classification Search
CPC ..... H04M 3/42391; H04M 2203/4581; H04M 2201/60; H04M 2203/4527
See application file for complete search history.

(56) References Cited

U.S. PATENT DOCUMENTS

| 8,887,306 | B1* | 11/2014 | Palacio | H04N 21/234336 |
| | | | | 713/182 |
| 9,374,536 | B1* | 6/2016 | Nola | |
| 2002/0199096 | A1 | 12/2002 | Wenocur et al. | |
| 2003/0088687 | A1* | 5/2003 | Begeja | H04N 7/17318 |
| | | | | 709/231 |
| 2004/0064317 | A1* | 4/2004 | Othmer | G06Q 10/10 |
| | | | | 704/260 |
| 2007/0094333 | A1 | 4/2007 | Schilling et al. | |
| 2007/0263259 | A1* | 11/2007 | Yoshimura | H04L 51/08 |
| | | | | 358/402 |
| 2008/0198979 | A1* | 8/2008 | Skakkebaek | H04L 51/066 |
| | | | | 379/88.13 |

(Continued)

FOREIGN PATENT DOCUMENTS

| CN | 101252636 A | 8/2008 |
| CN | 202602809 U | 12/2012 |

OTHER PUBLICATIONS

Auto-Captioning, website: http://www.yuja.com/auto-captioning/, retrieved on Aug. 10, 2016, 2 pages.

(Continued)

*Primary Examiner* — Stella Woo
(74) *Attorney, Agent, or Firm* — Maschoff Brennan

(57) ABSTRACT

A computer-implemented method to provide transcripts of multimedia messages is disclosed. The method may include receiving, at a server, a message with an attached media file. The message may be directed to a user device. The server may be configured to receive and direct messages to the user device. The method may further include separating the media file from the message before the message is provided to the user device. The method may also include generating, at a transcription system, a transcript of audio data in the media file. The method may also include providing the message to the user device for presentation of the message on the user device. The method may further include providing the transcript and the media file to the user device for presentation of the transcript and the media file on the user device.

17 Claims, 7 Drawing Sheets

(56) References Cited

U.S. PATENT DOCUMENTS

| | | |
|---|---|---|
| 2008/0284910 A1* | 11/2008 | Erskine .................. G11B 27/11 348/468 |
| 2012/0020465 A1 | 1/2012 | Davies et al. |
| 2012/0020577 A1* | 1/2012 | Yasrebi ................... H04L 51/34 382/229 |
| 2012/0053938 A1 | 3/2012 | Trivi |
| 2013/0033560 A1 | 2/2013 | Rasalkar et al. |
| 2013/0042283 A1 | 2/2013 | Begeja et al. |
| 2015/0011251 A1 | 1/2015 | Parker |
| 2016/0274764 A1* | 9/2016 | Moreau ............... G06F 3/04842 |
| 2017/0062010 A1* | 3/2017 | Pappu .................. G11B 27/036 |

OTHER PUBLICATIONS

Can captions be generated automatically using speech recognition?, website: http://accessibletech.org/access_articles/multimedia/captionsGeneratedAuto.php, retrieved on Aug. 10, 2016, 2 pages.

* cited by examiner

TRANSCRIBING MEDIA FILES

FIELD

The embodiments discussed herein are related to transcribing media files of multimedia messages.

BACKGROUND

Modern telecommunication services provide features to assist those who are deaf or hearing-impaired. One such feature is a text captioned telephone system for the hearing impaired. A text captioned telephone system may be a telecommunication intermediary service that is intended to permit a hearing-impaired user to utilize a normal telephone network.

The subject matter claimed herein is not limited to embodiments that solve any disadvantages or that operate only in environments such as those described above. Rather, this background is only provided to illustrate one example technology area where some embodiments described herein may be practiced.

SUMMARY

A computer-implemented method to provide transcriptions of a multimedia message is disclosed. The method may include receiving, at a server, a message with an attached media file. The message may be directed to a user device and the server may be configured to receive and direct messages to the user device. The server may also be configured to separate the media file from the message before the message is provided to the user device. The method may further include generating, at a transcription system, a transcript of audio data in the media file and providing the message to the user device for presentation of the message on the user device. The method may further include, providing the transcript and the media file to the user device for presentation of the transcript and the media file on the user device.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure relate to a method and/or system that may transcribe multimedia messages. In some embodiments, a device, for example a smart phone, may send a multimedia message, which may include a media file, over a network to a user device. A user of the user device may be hearing-impaired. As a result, the user may not be able to fully understand audio received as part of the media file included in the multimedia message. For example, the audio may be voice data generated by another device that is attached to the multimedia message. As another example, the audio may be audio from a video file attached to the multimedia message.

The multimedia message may be sent to a processing system before being provided to the user device. The processing system may be configured to separate the media file from the multimedia message prior to the multimedia message being delivered to the user device. After separating the media file from the multimedia message, the media file may be provided to a transcription system. In these and other embodiments, the transcription system may be configured to transcribe the audio from the media file and send a transcript of the audio to the user device for presentation to the user. The transcription system may also be configured to send the media file of the multimedia message to the user device for presentation to the user. The transcript may assist the user to understand the audio from the media file. The processing system may send the multimedia message to the user device for presentation of the multimedia message on the user device along with the media file.

In some embodiments, the systems and/or methods described in this disclosure may help to enable the transcription of a media file attached to a multimedia message received at a user device or other devices. Thus, the systems and/or methods provide at least a technical solution to a technical problem associated with the design of user devices in the technology of telecommunications.

Figure 1:
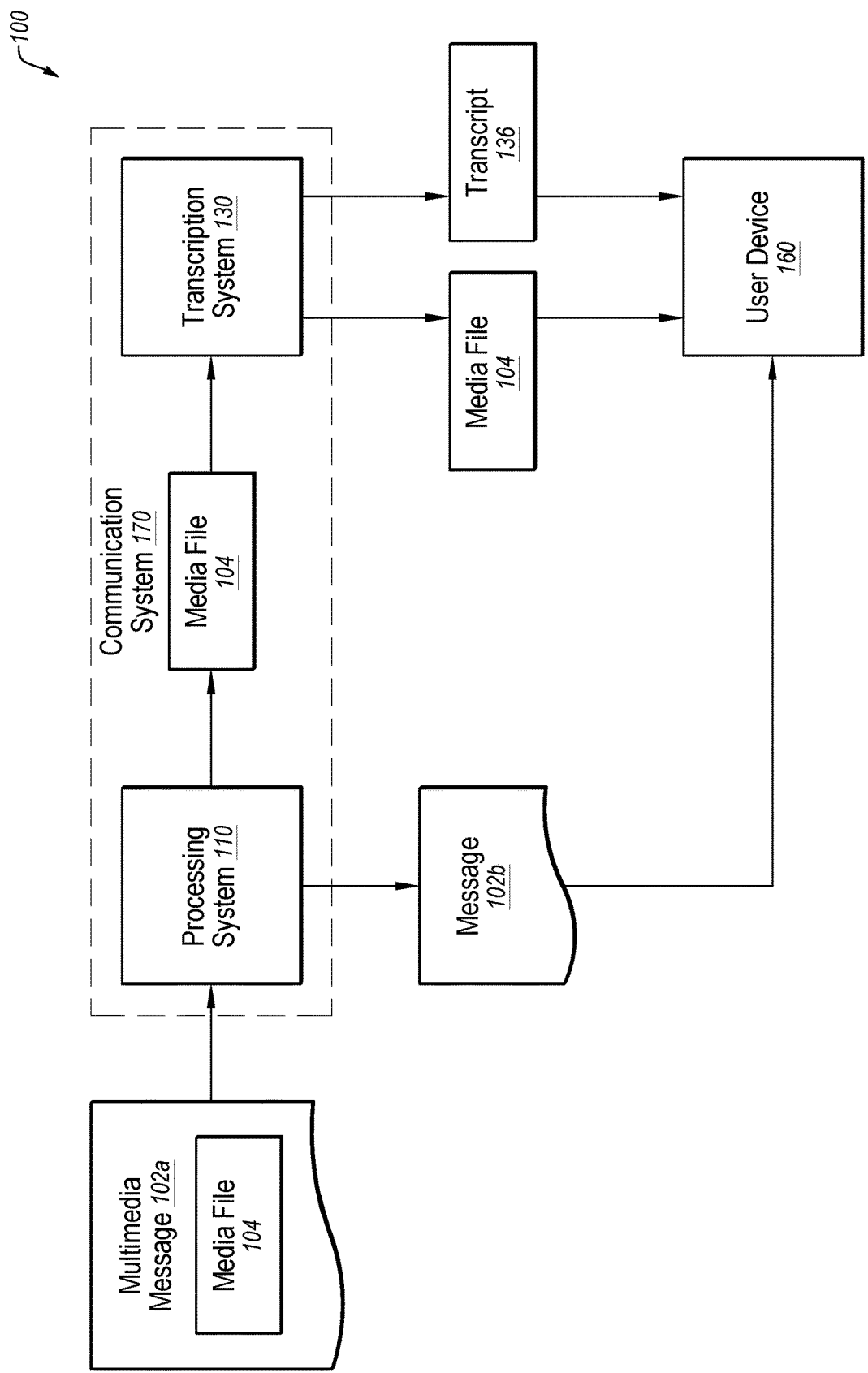
FIG. 1 illustrates a first example environment related to providing transcriptions of a multimedia message.

Turning to the figures, FIG. 1 illustrates a first example environment 100 related to providing transcripts of a multimedia message. The environment 100 may be arranged in accordance with at least one embodiment described in the present disclosure. The environment 100 may include a communication system 170 including a processing system 110 and a transcription system 130, and a user device 160.

In some embodiments, the communication system 170 may be configured to direct multimedia messages 102a to the user device 160. The communication system 170 may be configured to direct messages from the user device 160. In some embodiments, the user device 160 may be configured to receive messages only through the communication system 170 and to send messages only through the communication system 170. In these and other embodiments, the communication system 170 may be a host system that is configured to receive messages destined for the user device 160 and relay the messages to the user device 160. For example, when the multimedia message 102a is directed to the user device 160, the network address of the user device 160 may be such that the multimedia message 102a is routed through the communication system 170 to the user device 160.

The user device 160 may be any electronic or digital device. For example, the user device 160 may be a smartphone, a mobile phone, a tablet computer, a laptop computer, a desktop computer, a phone console, or other processing device. In some embodiments, the user device 160 may include or be a phone console. The user device 160 may include a video screen and a speaker system. The user device 160 may be configured to present the message 102b, to present the media file 104, and to present the transcript 136 for viewing and/or listening on the user device 160. The user device 160 may be configured to present the transcript 136 during playback of the media file 104 on the user device 160.

In some embodiments, the user device 160 may be configured to interact with the multimedia message 102*a* through the communication system 170.

In some embodiments, the processing system 110 may include any configuration of hardware, such as one or more processors, servers, and databases that are networked together and configured to perform a task. For example, the processing system 110 may include one or more multiple computing systems, such as multiple servers that each include memory and at least one processor, which are networked together and configured to perform operations as described in this disclosure, among other operations. In some embodiments, the processing system 110 may include computer-readable-instructions that are configured to be executed by the processing system 110 to perform operations described in this disclosure.

The processing system 110 may be configured to receive a multimedia message 102*a* and direct the multimedia message 102*a* to a user device 160. The multimedia message 102*a* may be any electronic or digital message. For example, the multimedia message 102*a* may include a Multimedia Messaging Service (MMS) message, an email message, or another messaging type that may include a media file 104. In some embodiments, the media file 104 may be included in the multimedia message 102*a* by being attached to the multimedia message 102*a*. For example, the multimedia message 102*a* may be an MMS message that includes text and an attached video file or an attached audio file as the media file 104. The multimedia message 102*a* may be sent from any user or any technology device. For example, the multimedia message 102*a* may be sent from a smartphone, a mobile phone, a tablet computer, a laptop computer, a desktop computer, a phone console, or other processing device.

The multimedia message 102*a* may be received by the processing system 110 over a network. In some embodiments, the network may include a peer-to-peer network. The network may also be coupled to or may include portions of a telecommunications network for sending data in a variety of different communication protocols. In some embodiments, the network may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. The network may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network may include one or more IEEE 802.11 wireless networks, optical networks, a conventional type network, a wired network, and may have numerous different configurations.

In some embodiments, the processing system 110 may be configured to separate the media file 104 from the multimedia message 102*a*. As a result, the processing system 110 may separately transmit the media file 104 and a message 102*b* without the media file 104. In these and other embodiments, the message 102*b* may be the multimedia message 102*a*, but stripped of the media file 104. The processing system 110 may be configured to send the media file 104 without the message 102*b* to the transcription system 130. The processing system 110 may also be configured to send the message 102*b* to the user device 160.

The transcription system 130 may be communicatively coupled to the processing system 110. The transcription system 130 may be configured to receive the media file 104 from the processing system 110. In some embodiments, the transcription system 130 may be communicatively coupled to the processing system 110 over a network.

In some embodiments, the network may include any network or configuration of networks configured to send and receive communications between devices. In some embodiments, the network may include a conventional type network, a wired or wireless network, and may have numerous different configurations. Furthermore, the network may include a local area network (LAN), a wide area network (WAN) (e.g., the Internet), or other interconnected data paths across which multiple devices and/or entities may communicate. In some embodiments, the network over which the transcription system 130 is communicatively coupled to the processing system 110 may not be the same as the network over which the processing system 110 receives the multimedia message 102*a*.

In some embodiments, the transcription system 130 may be configured to generate a transcript 136 by transcribing audio data of the media file 104 received from the processing system 110. In some embodiments, the transcription system 130 may include any configuration of hardware, such as processors, servers, and databases that are networked together. For example, the transcription system 130 may include multiple computing systems, such as multiple servers that each include memory and at least one processor, which are networked together and configured to perform operations as described in this disclosure, among other operations. In some embodiments, the transcription system 130 may include computer-readable-instructions that are configured to be executed by the transcription system 130 to perform operations described in this disclosure.

In some embodiments, the transcription system 130 may be configured to transcribe audio data of the media file 104 received from the processing system 110 to generate a transcript 136 of the audio data. In some embodiments, to transcribe the audio data, a call assistant may listen to the audio data and "revoice" the words of the audio data to a speech recognition computer program tuned to the voice of the call assistant. In these and other embodiments, the call assistant may be an operator who serves as a human intermediary between a hearing impaired user and the media file 104. In some embodiments, the transcript 136 may be generated by the speech recognition computer. In some embodiments, the media file 104 may be sent to a speech recognition computer program without "revoicing" of the audio data of the media file 104 by a call assistant or other human intermediary. For example, the audio data of the media file 104 may be sent directly to a speech recognition computer program which may generate the transcript 136 without the use of a call assistant or human intermediary.

In some embodiments, the transcription system 130 may be configured to provide the generated transcript 136 to the user device 160 over a network. The transcription system 130 may also be configured to provide the media file 104 to the user device 160 over a network. The network over which the media file 104 may be provided to the user device 160 may not be the same network as the network over which the multimedia message 102*a* is received by the processing system 110. The network over which the media file 104 may be provided to the user device 160 may or may not be the same network as the network over which the media file 104 is provided to the transcription system 130. In these and other embodiments, the user device 160 may be configured to present the generated transcripts 136. For example, the generated transcripts 136 may be displayed on a display of the user device 160.

In response to the media file 104 being an audiovisual file, the user device 160 may be configured to present the media file 104 on a display of the user device 160. The video of the audiovisual file may be presented on a display of the user device 160. In response to the media file 104 being an audio file, the user device 160 may be configured to present the audio file, such as through one or more speakers, and present an image on a display of the user device 160. In some embodiments, the image may be a picture of a contact that sent the multimedia message 102a to the user device 160. Alternatively or additionally, the image may be a picture of a musical note to denote that the media file 104 is an audio file.

An example of the operation of the environment 100 follows. A multimedia message 102a may be sent from a device and directed to the user device 160. The multimedia message may be sent via one or more networks. The networks may include cellular networks, the Internet, and other wireless or wired networks. The network address of the user device 160 may be such that the multimedia message 102a is provided to the communication system 170. For example, the multimedia message 102a may be provided to the processing system 110 before the multimedia message 102a is sent to the user device 160. For example, an email with an attached video file may be sent from a laptop computer to a user device 160. Alternatively or additionally, an MMS message with an audio file may be sent from a smartphone to a user device 160.

The user device 160 may be used by a user that is hearing-impaired. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

The multimedia message 102a may include an attached media file 104 that may include audio data. The audio data and the attached media file 104 may originate from any other device. For example, the media file 104 may be a video recorded on a tablet computer. Alternatively or additionally, the media file 104 may be audio data recorded on a smartphone. The audio data may be based on a voice signal from a user of a smartphone device. For example, the voice signal may be words spoken by the user of the smartphone device prior to sending the multimedia message 102a to the user device 160.

The processing system 110 may separate the media file 104 from the multimedia message 102a. The processing system 110 may send the media file 104 to the transcription system 130. The processing system 110 may send the media file 104 received from a user or from the user device 160 to the transcription system 130 via one or more networks.

The transcript 136 of the audio data of the media file 104 may be provided over a network to the user device 160. The media file 104 may be provided over a network to the user device 160 from the transcription system 130. Alternatively or additionally, the media file 104 may be provided to the user device 160 together with the message 102b. In some embodiments, the user device 160, by way of an application associated with the transcription system 130 and an electronic display, may display the transcript 136 while the media file 104 is also displayed on the electronic display. For example, the media file 104 may be a video and the transcript 136 of the audio data of the media file 104 may be displayed while the video is being displayed on an electronic display of the user device 160. The transcript 136 may allow the hearing-impaired user to supplement the audio data received from the user device 160 and confirm his or her understanding of the words spoken in the media file 104.

The environment 100 may be configured to provide the transcript 136 of the audio data in substantially real-time or real-time. In some embodiments, the message 102b may be presented on the user device 160 prior to the generation of a transcript 136 of the audio data of the media file at the transcription system 130. For example, the transcript 136 of the audio data of the media file may be provided to the user device 160 in less than 2, 3, 5, or 10 seconds after the audio data is presented to the user of the user device 160 by an audio output device. In some embodiments, the transcript 136 may be generated prior to the transmission of the multimedia message to the user device 160 and the transcript 136 of the audio data may not be provided in substantially real-time. As described, the environment 100 may be configured to provide transcripts of media files attached to multimedia messages 102a directed to the user device 160.

In some embodiments, the user device 160 may be associated with a hearing impaired user and may be in communication with the transcription system 130. In these and other embodiments, the media file 104 may capture words spoken by a variety of individuals in the format of an audiovisual recording or an audio recording. The processing system 110 may send the media file 104 to the user device 160 via the transcription system 130 and over a network. The media file 104 may be transmitted over a network and may be sent to the user device 160 as a media file for presentation to the user of the user device 160 as a normal media file. The processing system 110 may transmit the media file 104 received over a network to the transcription system 130 with an indication that the transcript 136 and the media file 104 be provided to the user device 160. The transcription system 130 may transcribe the audio data of the media file 104 and provide the transcript 136 to the user device 160. The user device 160 may present the transcript 136 along with the media file 104 on a display of the user device 160 for the hearing-impaired user of the user device 160.

Modifications, additions, or omissions may be made to the environment 100 without departing from the scope of the present disclosure. For example, in some embodiments, the environment 100 may include additional devices similar to the user device 160. Alternatively or additionally, the message 102 may be directed to multiple user devices 160. Alternatively or additionally, one or more of the communication couplings between the sender of the multimedia message 102a and the user device 160 may be a wired connection. In some embodiments, the processing system 110 and the user device 160 may be the same device.

Alternatively or additionally, the processing system 110 may create a copy of the media file 104 and may not separate the media file 104 from the multimedia message 102a. Alternatively or additionally, the audio data of the media file 104 may be obtained by the transcription system 130 via a link to a webpage on the Internet. In some embodiments, the media file 104 may be a link to a media file or a link to a media stream. In these and other embodiments, the processing system 110 may remove or make a copy of the link. In these and other embodiments, the processing system 110 may send the link to the transcription system 130. The link may be used by the transcription system 130 to obtain audio that may be transcribed. For example, the transcription system 130 may use the link to access a webpage on the Internet to obtain the audio data of an audiovisual stream or of an audiovisual file. The link may or may not be sent by the transcription system 130 to the user device 160. In some embodiments, the transcription system 130 may send the link to the media stream to the user device 160. The user device 160 may use the link to access a webpage on the Internet to obtain the audiovisual stream or the audiovisual file. In some embodiments, the transcript 136 may be automatically linked with the link such that it is presented along with the media from the media link on the user device 160. The transcript 136 may be presented on the user device 160 together with the media from the media link.

Figure 2:
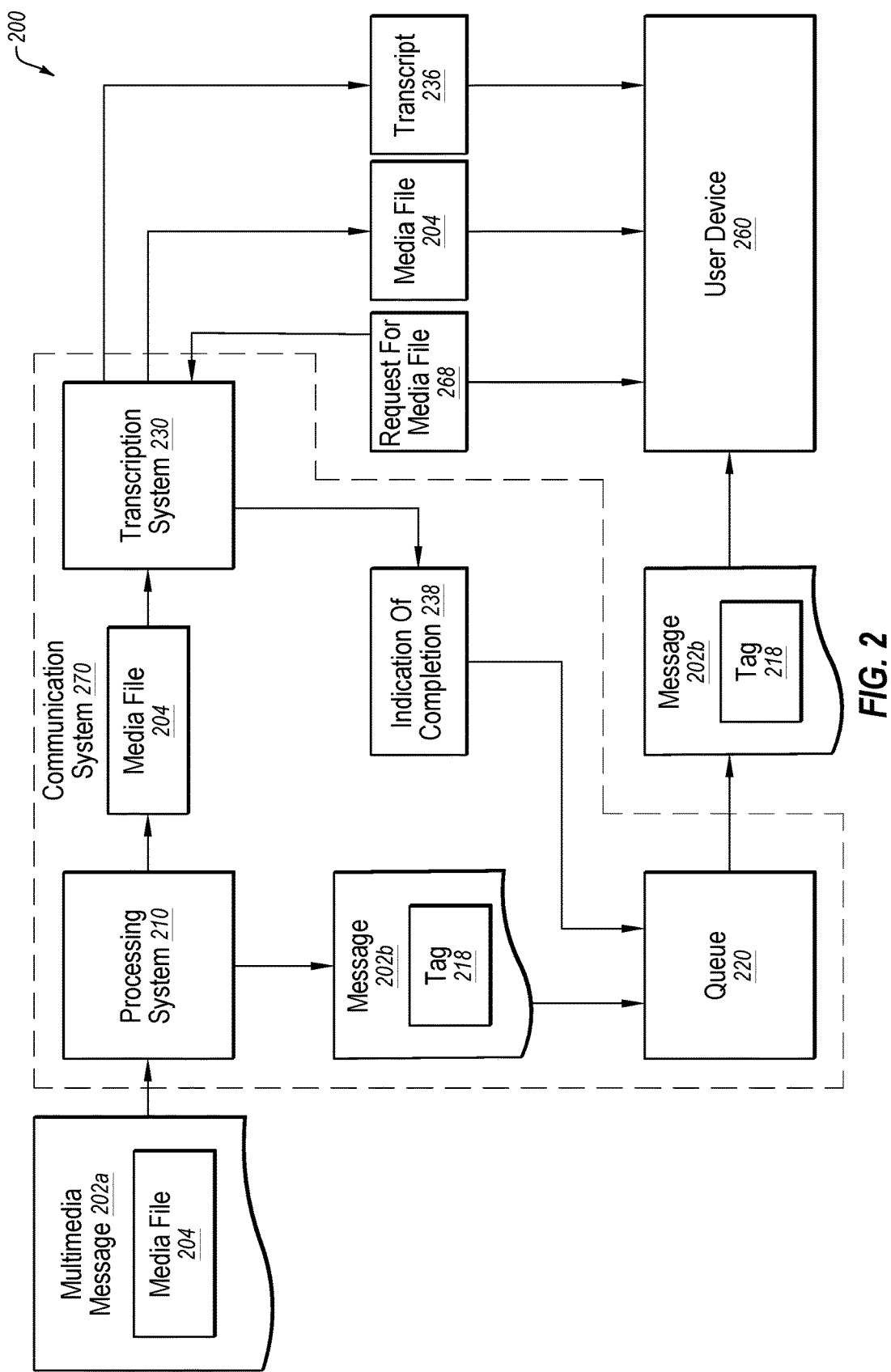
FIG. 2 illustrates a second example environment related to providing transcriptions of a multimedia message.

FIG. 2 illustrates a second example environment 200 related to providing transcripts of a multimedia message. The environment 200 may be arranged in accordance with at least one embodiment described in the present disclosure. The environment 200 may include a communication system 270 including a processing system 210, a transcription system 230, and a queue 220, and a user device 260.

In some embodiments, the communication system 270 may be configured to direct multimedia messages 202*a* to the user device 260. The communication system 270 may also be configured to direct messages from the user device 260. In some embodiments, the user device 260 may be configured to receive messages only through the communication system 270 and to send messages only through the communication system 270. In these and other embodiments, the communication system 270 may be a host system that is configured to receive messages for the user device 260 and relay the messages to the user device 260. For example, when the multimedia message 202*a* is directed to the user device 260, the network address of the user device 260 may be such that the multimedia message 202*a* is routed through the communication system 270 to the user device 260. For example, when the multimedia message 202*a* is a MMS, the communication system 270 may include functionality similar to Multimedia Messaging Service Center (MMSC). Alternatively or additionally, when the multimedia message 202*a* is an email, the communication system 270 may include functionality similar to an email exchange server. In these and other embodiments, the communication system 270 may receive the multimedia messages 202*a* from another server and be configured to relay the multimedia messages 202*a* to the user device 260.

The user device 260 may be any electronic or digital device and may be analogous to the user device 160 of FIG. 1, except the user device 260 may interact with the communication system 270 in a manner different than the user device 160 interacts with the communication system 170 of FIG. 1.

In some embodiments, the processing system 210 may include an analogous configuration of hardware as the processing system 110 of FIG. 1, but may perform one or more of the same tasks or one or more different tasks than the processing system 110 of FIG. 1. Thus, further description of hardware of the processing system 210 is not provided with respect to FIG. 2.

The processing system 210 may be configured to receive a multimedia message 202*a* and direct the multimedia message 202*a* to a user device 260. The multimedia message 202*a* may be analogous to the multimedia message 102*a* of FIG. 1 and may be received in an analogous manner, as such further description is not provided with respect to FIG. 2.

In some embodiments, the processing system 210 may be configured to separate the media file 204 from the multimedia message 202*a*. As a result, the processing system 210 may separately transmit the media file 204 and a message 202*b* without the media file 204.

For example, the multimedia messages 202*a* may be an email. In these and other embodiments, the processing system 210 may remove an attachment to the email that is a media file 204. Alternatively or additionally, the multimedia messages 202*a* may be an MMS that includes text and an embedded uniform resource locator (URL) for a temporary storage location of the media file 204 in a server with an HTTP front-end of a network that provided the multimedia messages 202*a* to the processing system 210. In these and other embodiments, the processing system 210 may strip the URL from the MMS, such that the media file 204 is the URL and the message 202*b* is the text from the MMS.

The processing system 210 may also be configured to add a media tag 218 to the message 202*b*. In these and other embodiments, the message 202*b* may include the multimedia message 202*a*, but stripped of the media file 204 and with the addition of the media tag 218. The processing system 210 may be configured to send the media file 204 without the message 202*b* to the transcription system 230. The processing system 210 may also be configured to send the message 202*b* with the media tag 218 to the queue 220.

In some embodiments, the media tag 218 may include information regarding the media file 204 stripped from the multimedia messages 202*a*. The information may be used to properly associate the media file 204 with the message 202*b* that has been stripped of the media file 204. For example, in some embodiments, the media tag 218 may be configured to include metadata about the media file 204 and/or the message 202*b*. For example, in some embodiments, the media tag 218 may include a name of the media file 204 and a length of the media file 204.

In some embodiments, the media tag 218 may be a unique identifier of the media file 204 within the communication system 270. The unique identifier may be used by the communication system 270 to locate and relay the media file 204 to the user device 260 or other devices that request the media file 204 using the unique identifier.

In some embodiments, the media tag 218 may include a file type of the media file 204 such as an audio file type or a video file type. In some embodiments, the media tag 218 may include information about a storage location of the media file 204 in the communication system 270. In these and other embodiments, the media file 204 may be stored in a database that may be accessed by the processing system 210 and the transcription system 230. Alternatively or additionally, the media tag 218 may include a link, such as a URL or type of location information, that may allow a device, such as the user device 260, to retrieve the media file 204 and files associated with the media file 204, such as a transcript of the media file 204.

The transcription system 230 may be communicatively coupled to the processing system 210 and may be configured to receive the media file 204 from the processing system 210. In some embodiments, the transcription system 230 may not physically receive the media file 204 from the processing system 210, but may receive a storage location of the media file 204 in a database in the communication system 270. For example, the transcription system 230 may receive a link to the media file 204.

In some embodiments, the transcription system 230 may be configured to generate a transcript 236 by transcribing audio data of the media file 204. The transcription system 230 may include a hardware configuration analogous to hardware configuration of the transcription system 130 of FIG. 1, but may perform one or more of the same tasks or one or more different tasks than the transcription system 130 of FIG. 1. Thus, further description of hardware of the transcription system 230 and operations analogous to the operations performed by the transcription system 130 are not provided with respect to FIG. 2.

In some embodiments, the transcription system 230 may be configured to provide an indication of completion 238 to the queue 220 over a network in response to completing the transcript 236 of the audio of the media file 204. The network over which the indication of completion 238 may be provided to the user device 260 may be the same network as the network over which the media file 204 is received by the transcription system 230. The indication of completion 238 may be a signal to the queue 220 that the transcript 236 of the audio of the media file 204 is complete. The indication of completion 238 may help enable the user device 260 to present the message 202b, the media file 204, and the transcript 236 to a user of the user device 260 at a single time as will be explained hereafter.

The queue 220 may be communicatively coupled to the processing system 210. The queue 220 may be configured to receive the message 202b with the media tag 218 from the processing system 210. In some embodiments, the queue 220 may be communicatively coupled to the processing system 210 over a network. In some embodiments, the network over which the queue 220 is communicatively coupled to the processing system 210 may not be the same as the network over which the processing system 210 receives the multimedia message 202a. In some embodiments, the network over which the queue 220 is communicatively coupled to the processing system 210 may be the same as the network over which the processing system 210 provides the media file 204 to the transcription system 230.

In some embodiments, the queue 220 may be configured to retain the message 202b with the media tag 218 until the queue 220 receives the indication of completion 238 from the transcription system 230. In response to receiving the indication of completion 238 from the transcription system 230, the queue 220 may provide the message 202b with the media tag 218 to the user device 260. Thus, the queue 220 may prevent the user device 260 from being aware of the multimedia messages 202a or the message 202b until after completion of the transcript 236.

Retaining the message 202b with the media tag 218 may facilitate the simultaneous presentation of the media file 204 and the transcript 236 on the user device 260. For example, the generation of the transcript 236 may not occur directly after the transcription system 230 may receive the media file 204 to generate the transcript 236. There may be a period of time between the receipt of the media file 204 and the generation of the transcript 236. As a result, if the message 202b was delivered to the user device 260 directly after separation of the media file 204 from the message 202b, the transcript 236 may be unavailable. Retaining the message 202b at the queue 220 until the transcript 236 is generated may help the communication system 270 to ensure that transcript 236 may be available for presentation by the user device 260 as soon as the user device 260 receives the message 202b and is able to present the media file 204. Thus, the queue 220 may facilitate the simultaneous presentation of the media file 204 and the transcript 236 on the user device 260.

In some embodiments, the user device 260 may be configured to receive the message 202b with the media tag 218. After receiving the message 202b with the media tag 218, the user device 260 may be configured to generate a request for media 268 using the information in the media tag 218. The request for media 268 may be directed to the transcription system 230 and may be configured to allow the transcription system 230 to determine the media file 204 that is associated with the message 202b and the media tag 218 and the transcript 236 associated with the media file 204.

In some embodiments, the user device 260 may generate and send the request for media 268 in response to receiving the message 202b from the queue 220. Alternatively or additionally, the user device 260 may generate and send the request for media 268 in response to a user interaction with the user device 260. For example, the user device 260 may be configured to provide an indication that the message 202b is available on the user device 260. For example, in response to receiving the message 202b from the queue 220, an indicator on the user device 260 may be used to alert a user that the message 202b is available on the user device 260. In these and other embodiments, the user may interact with the message 202b. The user device 260 may provide the request for media 268 in response to interacting with the message 202b on the user device 260. In some embodiments, interacting with the message may include opening the message 202b, selecting an option to download or stream the media file 204 on the user device 260, among other interactions with the message 202b.

In some embodiments, the transcription system 230 may be configured to provide the generated transcript 236 to the user device 260 over a network in response to receiving a request for media 268 from the user device 260. For example, the transcription system 230 may be configured to use the information from the request for media 268 to locate the media file 204 and the transcript 236 of the media file 204. In these and other embodiments, the transcription system 230 may be configured to provide the media file 204 and the transcript 236 to the user device 260 over a network in response to receiving a request for media 268 from the user device 260. The network over which the media file 204 may be provided to the user device 260 may not be the same network as the network over which the multimedia message 202a is received by the processing system 210. The network over which the media file 204 may be provided to the user device 260 may or may not be the same network as the network over which the media file 204 is provided to the transcription system 230.

In these and other embodiments, the user device 260 may be configured to present the media file 204 and the transcript 236. For example, the generated transcript 236 may be displayed on a display of the user device 260. In response to the media file 204 being an audiovisual file, the user device 260 may be configured to present the media file 204 on a display of the user device 260. The video of the audiovisual file may be presented on a display of the user device 260. In response to the media file 204 being an audio file, the user device 260 may be configured to present the audio file, such as through one or more speakers, and present an image on a display of the user device 260.

An example of the operation of the environment 200 follows. A multimedia message 202a may be sent from a device and directed to a user device 260.

The processing system 210 may separate the media file 204 from the multimedia message 202a. The processing system 210 may generate a media tag 218 with an identifier of the media file 204 for the communication system 270. The processing system 210 may attach the media tag 218 to the separated message 202b. The processing system 210 may send the media file 204 to the transcription system 230. The processing system 210 may send the media file 204 received from a user or from the user device 260 to the transcription system 230 via one or more networks. The processing system 210 may provide the message 202b with the media tag 218 to the queue 220. The message 202b with the media tag 218 may remain in the queue 220 until the queue 220 receives the indication of completion 238 from the transcription system 230 in response to the transcription system 230 completing the transcript 236 of the media file 204. In response to receiving the indication of completion 238 from the transcription system 230, the queue 220 may provide the message 202b with the media tag 218 to the user device 260.

In response to receiving the message 202b with the media tag 218, the user device 260 may send the request for media 268 based on the media tag 218 In response to receiving the request for media 268, the transcription system 230 locates the media file 204 and the transcript 236 generated based on the media file 204. The transcription system 230 may provide the media file 204 and the transcript 236 associated with the media file 204 to the user device 260.

Modifications, additions, or omissions may be made to the environment 200 without departing from the scope of the present disclosure. For example, in some embodiments, the environment 200 may include additional devices similar to the user device 260. Alternatively or additionally, the multimedia message 202a may be directed to multiple user devices 260. In these and other embodiments, the media tags 218 provided to each of the multiple user devices 260 may include information to a single media file 204 and a single transcript 236 that may be shared among the multiple user devices 260 such that multiple transcripts are not made of the same media file 204.

In some embodiments, one or more of the communication couplings between the sender of the multimedia message 202a and the user device 260 may be a wired connection. In some embodiments, the processing system 210 and the user device 260 may be the same device.

Alternatively or additionally, the processing system 210 may create a copy of the media file 204 and may not separate the media file 204 from the multimedia message 202a. In these and other embodiments, the transcription system 230 may provide the transcript 236 in request to the request for media 268 and may not send the media file 204. Alternatively or additionally, the audio data of the media file 204 may be obtained by the transcription system 230 via a URL to a webpage on the Internet. In some embodiments, the media file 204 may be a link to a media file or a link to a media stream. In these and other embodiments, the transcription system 230 may provide the transcript 236 in request to the request for media 268 and may not send the media file 204. In these and other embodiments, the user device 260 may obtain the media file 204 from the queue 220 or from another source other than the communication system 270.

Alternatively or additionally, in some embodiments, the environment 200 may not include the media tag 218. In these and other embodiments, the processing system 210 may separate the media file 204 from the multimedia message 202a and may not attach the media tag 218 to the message 202b. In these and other embodiments, the transcription system 230 may send the indication of completion 238 to the queue 220. The queue 220 may transmit the message 202b without the media tag 218 to the user device 260. In these and other embodiments, the user device 260 may be configured to transmit the request for media 268 to the transcription system 230 in response to receiving the message 202b from the queue 220 based on information in the message 202b. In these and other embodiments, the transcription system 230 may associate the media file 204 and the transcript 236 with the message 202b based on a unique identifier from the multimedia message 202a.

Alternatively or additionally, in some embodiments, the environment 200 may not include the queue 220. In these and other embodiments, the message 202b may be sent directly to the user device 260 prior to the completion of the transcript 236 in the transcription system 230. In these and other embodiments, the transcription system 230 may provide the indication of completion 238 to the user device 260 in response to completing the transcript 236 of the audio of the media file 204. In response to receiving the indication of completion 238 from the transcription system 230, the user device 260 may present an alert on a display that the message 202b is available on the user device 260. In some embodiments, the user device 260 may present the message 202b with the media tag 218 in response to receiving the indication of completion 238 from the transcription system 230. Presenting the message 202b with the media tag 218 in response to receiving the indication of completion 238 may facilitate the simultaneous presentation of the media file 204 and the transcript 236 on the user device 260. In some embodiments, the generation of the transcript 236 may cause a delay in the presentation of the transcript 236 on the user device 260. In some embodiments, not indicating a receipt of the message 202b until receipt of the indication of completion 238 may facilitate the presentation of the transcript 236 with the media file 204.

Figure 3:
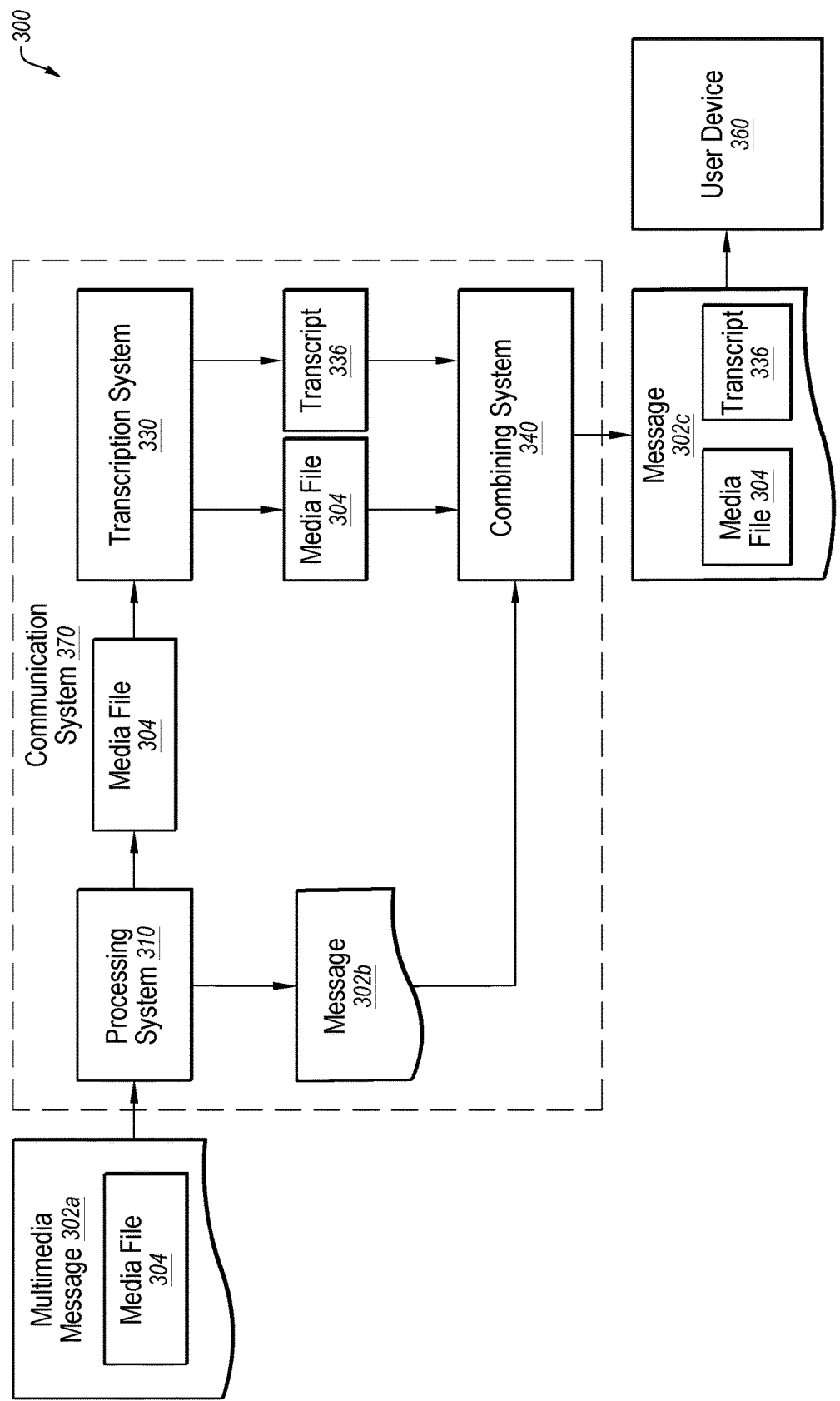
FIG. 3 illustrates a third example environment related to providing transcriptions of a multimedia message.

FIG. 3 illustrates a third example environment 300 related to providing transcripts of a multimedia message. The environment 300 may be arranged in accordance with at least one embodiment described in the present disclosure. The environment 300 may include a communication system 370 that includes a processing system 310, a transcription system 330, and a combining system 340, and a user device 360.

In some embodiments, the communication system 370 may be configured to direct multimedia messages 302a to the user device 360. The communication system 370 may be configured to direct messages from the user device 360. In some embodiments, the user device 360 may be configured to receive messages only through the communication system 370 and to send messages only through the communication system 370. In these and other embodiments, the communication system 370 may be a host system that is configured to receive messages for the user device 360 and relay the messages to the user device 360. For example, when the multimedia message 302a is directed to the user device 360, the network address of the user device 360 may be such that the multimedia message 302a is routed through the communication system 370 to the user device 360.

The user device 360 may be any electronic or digital device and may be analogous to the user device 160 of FIG. 1, except the user device 360 may interact with the communication system 370 in a manner different than the user device 160 interacts with the communication system 170 of FIG. 1.

In some embodiments, the processing system 310 may include an analogous configuration of hardware as the processing system 110 of FIG. 1, but may perform one or more of the same tasks or one or more different tasks than the processing system 110 of FIG. 1. Thus further description of hardware of the processing system 310 is not provided with respect to FIG. 3.

The processing system 310 may be configured to receive a multimedia message 302a. The multimedia message 302a may be analogous to the multimedia message 102a of FIG.

1 and may be received in an analogous manner, as such further description is not provided with respect to FIG. 3.

In some embodiments, the processing system 310 may be configured to separate the media file 304 from the multimedia message 302a. As a result, the processing system 310 may separately transmit the media file 304 and a message 302b without the media file 304. In these and other embodiments, the message 302b may be the multimedia message 302a, but stripped of the media file 304. The processing system 310 may be configured to send the media file 304 without the message 302b to the transcription system 330. The processing system 310 may also be configured to send the message 302b to a combining system 340.

The transcription system 330 may include an analogous configuration of hardware as the processing system 110 of FIG. 1, but may perform one or more of the same tasks or one or more different tasks than the processing system 110 of FIG. 1. Thus, further description of hardware of the transcription system 330 and analogous operation to the transcription system 130 is not provided with respect to FIG. 3.

In some embodiments, the transcription system 330 may be configured to receive the media file 304 from the processing system 310. The transcription system 330 may also be configured to generate a transcript 336 by transcribing audio data of the media file 304 received from the processing system 310 and to provide the generated transcript 336 to the combining system 340. The transcription system 330 may also be configured to provide the media file 304 to the combining system 340.

The combining system 340 may be communicatively coupled to the processing system 310 and to the transcription system 330. The combining system 340 may be configured to receive the media file 304 and the transcript 336 from the transcription system 330.

In some embodiments, the combining system 340 may include any configuration of hardware, such as processors, servers, and databases that are networked together. For example, the combining system 340 may include multiple computing systems, such as multiple servers that each include memory and at least one processor, which are networked together and configured to perform operations as described in this disclosure, among other operations. In some embodiments, the combining system 340 may include computer-readable-instructions that are configured to be executed by the combining system 340 to perform operations described in this disclosure.

In some embodiments, the combining system 340 may be configured to combine the message 302b received from the processing system 310, the media file 304 received from the transcription system 330, and the transcript 336 received from the transcription system 330 to generate a combined message 302c. In some embodiments, to combine the message 302b, the media file 304, and the transcript 336, the combining system may attach the media file 304 and the transcript 336 to the message 302b to generate a combined message 302c. In some embodiments, the transcript 336 may be incorporated into the media file 304 as closed-captioning data. Alternatively or additionally, the transcript 336 may be separate from the media file 304.

In some embodiments, the combining system 340 may be configured to provide the generated combined message 302c to the user device 360 over a network. The network over which the combined message 302c may be provided to the user device 360 may not be the same network as the network used for communication between the processing system 310, the transcription system 330, and the combining system 340.

In these and other embodiments, the user device 360 may be configured to present the combined message 302c. For example, the combined message 302c may be presented on a display of the user device 360.

In these and other embodiments, in response to the combined message 302c being displayed on a display of the user device 360, the media file 304 attached to the combined message 302c may be selected. The user device 360 may be configured to present the media file 304 of the combined message 302c on a display of the user device 360. In these and other embodiments, the user device 360 may be configured to present the transcript 336 of the combined message 302c. The transcript 336 may be displayed on a display of the user device 360. In some embodiments, the transcript 336 may be selected from the combined message 302c and may be presented on a display of the user device 360.

Modifications, additions, or omissions may be made to the environment 300 without departing from the scope of the present disclosure. For example, in some embodiments, the environment 300 may include additional devices similar to the user device 360. Alternatively or additionally, the message 302 may be directed to multiple user devices 360. Alternatively or additionally, one or more of the communication couplings between the sender of the multimedia message 302a and the user device 360 may be a wired connection. In some embodiments, the processing system 310 and the user device 360 may be the same device.

Alternatively or additionally, the processing system 310 may create a copy of the media file 304 and may not separate the media file 304 from the multimedia message 302a. In these and other embodiments, the combining system 340 may be configured to insert the transcript 336 generated based on the media file 304 into the multimedia message 302a to generate the message 302c. In some embodiments, the transcript 336 may be incorporated into the media file 304 as closed-captioning data and may not be a separate element of the combined message 302c. In some embodiments, the media file 304 may include a link to the transcript 336. Alternatively or additionally, the communication system 370 may not include the processing system 310. In these and other embodiments, the transcription system 330 may receive the multimedia message 302a and generate a transcript of the media file 304. The combining system 340 may combine the transcript 336 with the multimedia messages 302a to generate the message 302c provided to the user devices 360.

Figure 4:
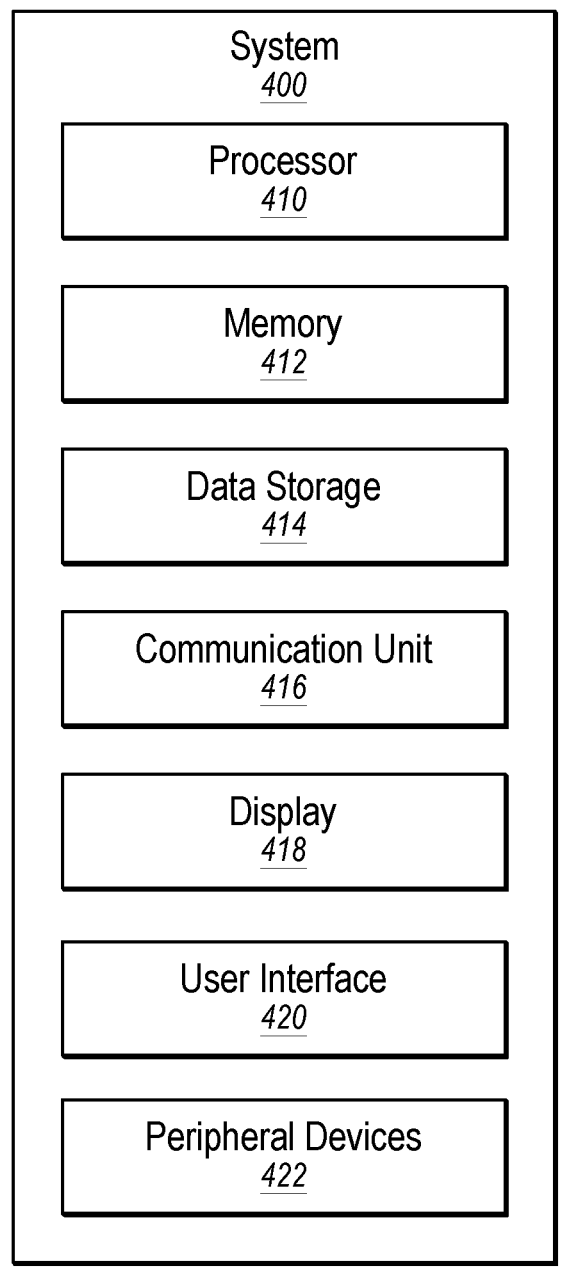
FIG. 4 illustrates an example system that may be used in providing transcriptions of a multimedia message.

FIG. 4 illustrates an example computing system 400 that may be arranged in accordance with at least one embodiment described in the present disclosure. The system 400 may include a processor 410, a memory 412, a data storage 414, a communication unit 416, a display 418, a user interface 420, and peripheral devices 422, which all may be communicatively coupled. In some embodiments, the system 400 may be part of any of the electronic devices described in this disclosure. For example, the system 400 may be part of the processing system 110 of FIG. 1, the transcription system 130 of FIG. 1, and/or the user device 160 of FIG. 1. The system 400 may also be part of system/components illustrated in FIGS. 2 and 3.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof.

Although illustrated as a single processor in FIG. 4, it is understood that the processor 410 may include any number of processors distributed across any number of networks or physical locations that are configured to perform individually or collectively any number of operations described herein. In some embodiments, the processor 410 may interpret and/or execute program instructions and/or process data stored in the memory 412, the data storage 414, or the memory 412 and the data storage 414. In some embodiments, the processor 410 may fetch program instructions from the data storage 414 and load the program instructions into the memory 412.

After the program instructions are loaded into the memory 412, the processor 410 may execute the program instructions. For example, the system 400 may be part of the processing system 110 of FIG. 1. In these and other embodiments, the program instructions may cause the processor 410 to perform the operations of separating a media file from a multimedia message. As another example, the system 400 may be part of the transcription system 130 of FIG. 1. The program instructions may cause the processor 410 to perform the operations of generating a transcript of a media file.

The memory 412 and the data storage 414 may include computer-readable storage media for carrying or having computer-executable instructions or data structures stored thereon. Such computer-readable storage media may be any available media that may be accessed by a general-purpose or special-purpose computer, such as the processor 410. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 416 may include any component, device, system, or combination thereof that is configured to transmit or receive information over a network. In some embodiments, the communication unit 416 may communicate with other devices at other locations, the same location, or even other components within the same system. For example, the communication unit 416 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), plain old telephone service (POTS), and/or the like. The communication unit 416 may permit data to be exchanged with a network and/or any other devices or systems described in the present disclosure.

The display 418 may be configured as one or more displays, like an LCD, LED, or other type display. The display 418 may be configured to present video, text captions, user interfaces, and other data as directed by the processor 410. For example, the display 418 may present a media file, a transcript, a multimedia message, among other information.

The user interface 420 may include any device that allows a user to interface with the system 400. For example, the user interface 420 may include a mouse, a track pad, a keyboard, a touchscreen, a telephone switch hook, and/or a telephone keypad, among other devices. The user interface 420 may receive input from a user and provide the input to the processor 410.

The peripheral devices 422 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 400 or otherwise generated by the system 400.

Modifications, additions, or omissions may be made to the system 400 without departing from the scope of the present disclosure.

Figure 5:
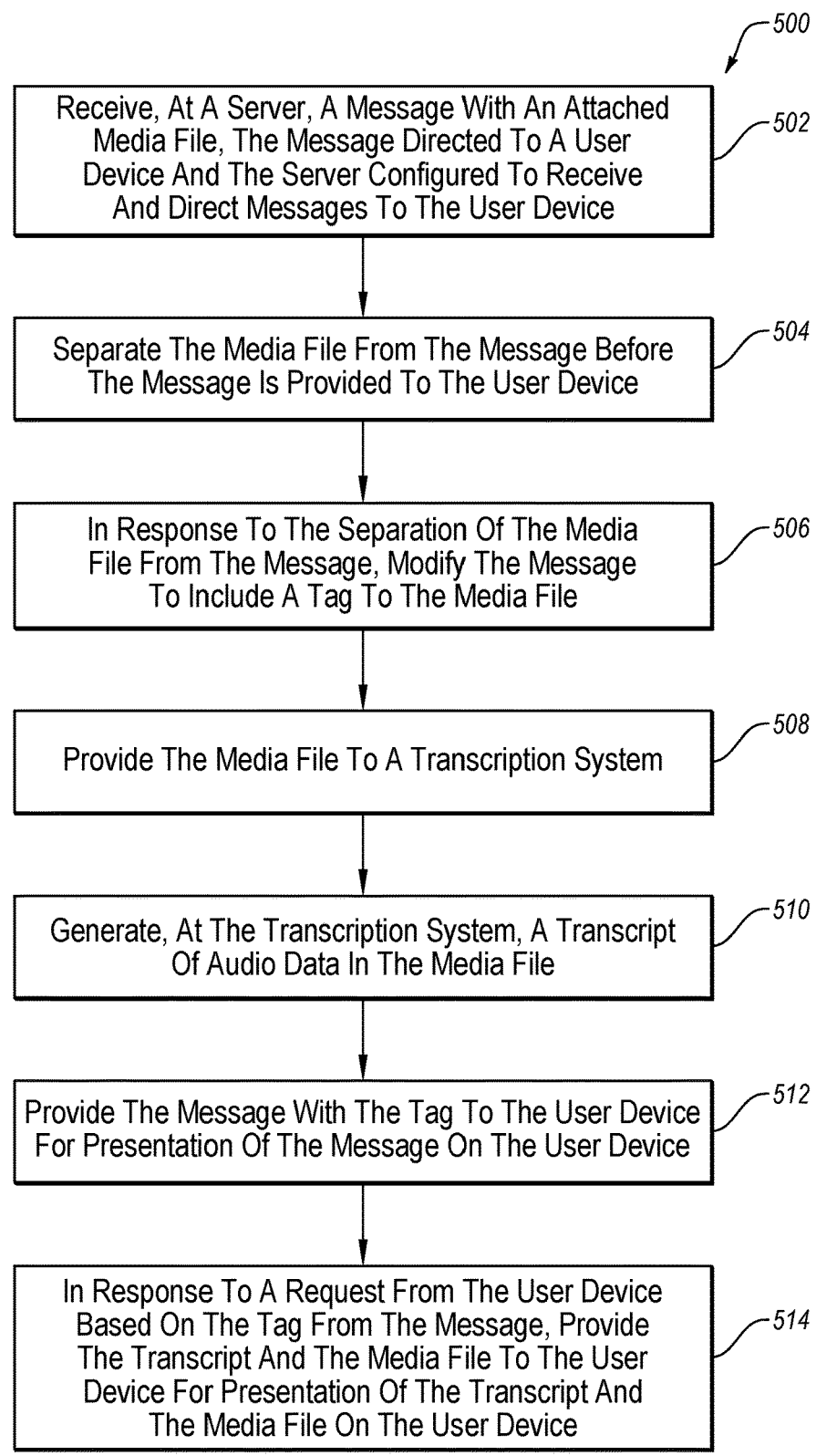
FIG. 5 is a flowchart of an example computer-implemented method to provide transcriptions of a multimedia message.

FIG. 5 is a flowchart of an example computer-implemented method to provide transcriptions of a multimedia message. The method 500 may be arranged in accordance with at least one embodiment described in the present disclosure. The method 500 may be performed, in whole or in part, in some embodiments by a system and/or environment, such as the environment 100, the environment 200, the environment 300, the system 400, and/or the communication system 700 of FIGS. 1, 2, 3, 4, and 7, respectively. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where a message with an attached media file may be received at a server. In some embodiments, the message may be directed to a user device. In some embodiments, the server may be configured to receive and direct messages to the user device.

In block 504, the media file may be separated from the message before the message is provided to the user device.

In block 506, in response to the separation of the media file from the message, the message may be modified to include a tag to the media file. In some embodiments, the media tag may include information regarding a storage location of the media file. In block 508, the media file may be provided to a transcription system.

In block 510, a transcript of audio data in the media file may be generated at the transcription system. In some embodiments, the generation of the transcript of the audio data may include modifying the media file to include closed-captioning data.

In block 512, the message with the tag may be provided to the user device for presentation of the message on the user device.

In block 514, in response to a request from the user device based on the tag from the message, the transcript and the media file may be provided to the user device for presentation of the transcript and the media file on the user device.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, the method 500 may further include combining the message, the transcript, and the media file; and providing the combination to the user device. Alternatively or additionally, the method 500 may include holding the message with the media tag in queue during the generation of the transcript such that the message with the media tag is not provided to the user device during the generation of the transcript.

Figure 6:
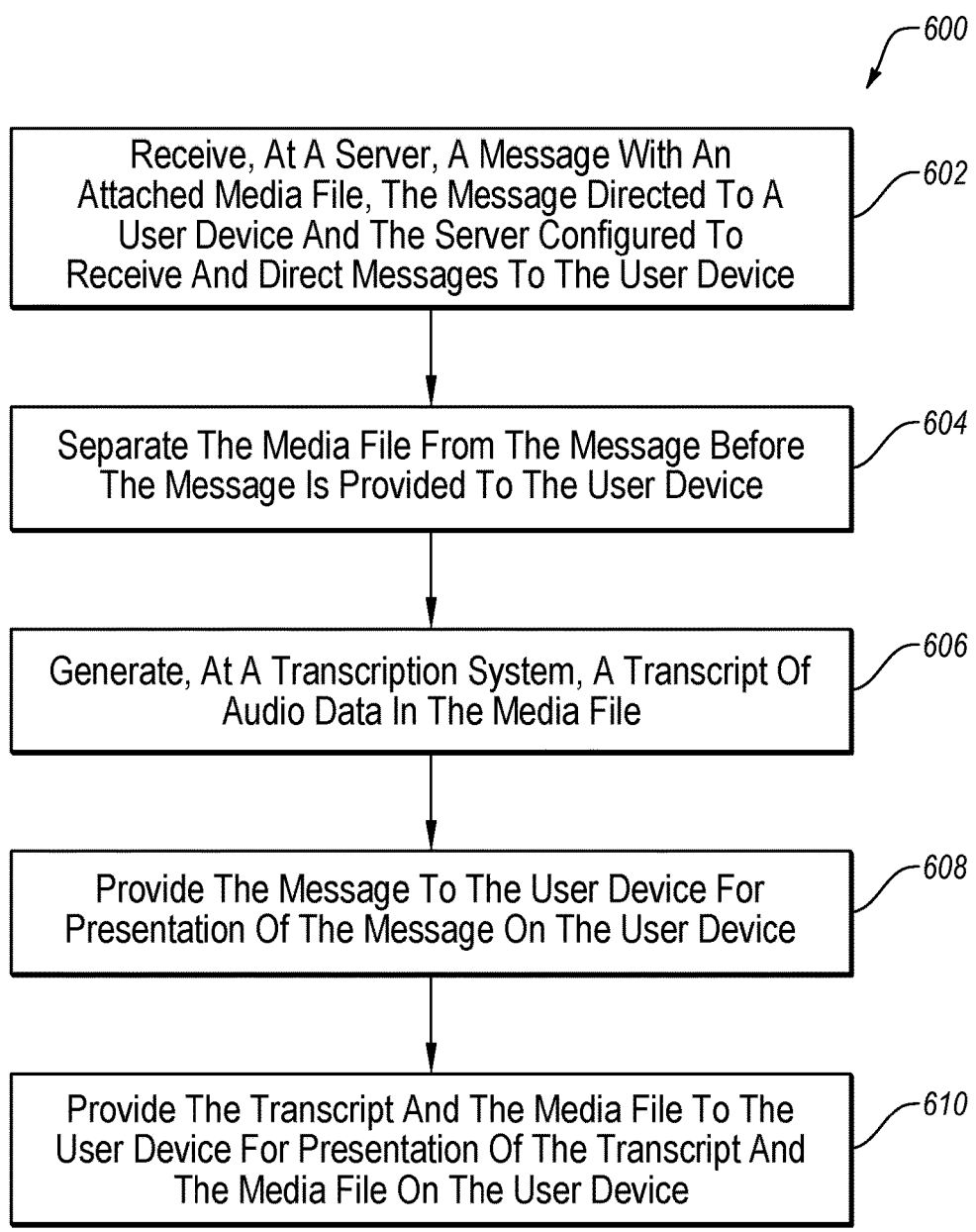
FIG. 6 is a flowchart of another example computer-implemented method to provide transcriptions of a multimedia message.

FIG. 6 is a flowchart of another example computer-implemented method to provide transcriptions of a multimedia message. The method 600 may be arranged in accordance with at least one embodiment described in the present disclosure. The method 600 may be performed, in whole or in part, in some embodiments by a system and/or environment, such as the environment 100, the environment 200, the environment 300, the system 400, and/or the communication system 700 of FIGS. 1, 2, 3, 4, and 7, respectively. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 602, where a message with an attached media file may be received at a server. In some embodiments, the message may be directed to a user device. In some embodiments, the server may be configured to receive and direct messages to the user device.

In block 604, the media file may be separated from the message before the message is provided to the user device. In block 606, a transcript of audio data in the media file may be generated at a transcription system. In some embodiments, the generation of the transcript of the audio data comprises modifying the media file to include closed-captioning data.

In block 608, the message may be provided to the user device for presentation of the message on the user device. In block 610, the transcript and the media file may be provided to the user device for presentation of the transcript and the media file on the user device.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 600 may further include in response to the separation of the media file from the message, modifying the message to include a media tag to the media file. Alternatively or additionally, the method 600 may further include combining the message, the transcript, and the media file and providing the combination to the user device.

In some embodiments, the method 600 may further include holding the message in queue until after the transcript of the audio data is generated. Alternatively or additionally, the method 600 may further include in response to the generation of the transcript of the audio data, providing an indication on the user device of receipt of the message.

In some embodiments, in the method 600 the media file may include information regarding a storage location of the transcript. In these and other embodiments, the method 600 may further include combining the message and the media file and providing the combination to the user device.

Figure 7:
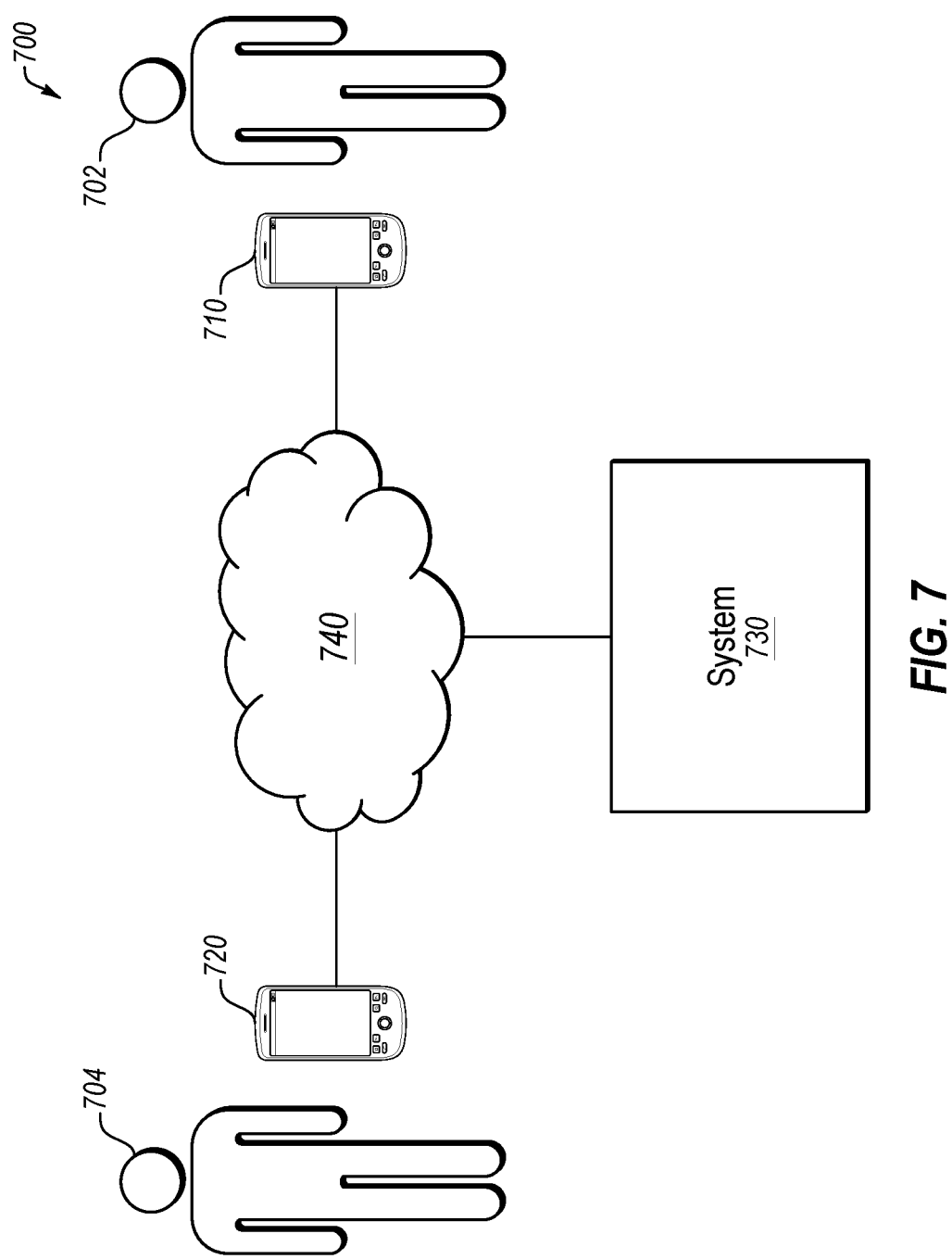
FIG. 7 illustrates an example communication system that may provide transcriptions of a multimedia message.

FIG. 7 illustrates an example communication system 700 that may provide transcriptions of a multimedia message. The communication system 700 may include an electronic device that is capable of sending a message. The communication system 700 may be arranged in accordance with at least one embodiment described in the present disclosure. The communication system 700 may include a first device 710, a second device 720, and a system 730. The first device 710 and the system 730 may be communicatively coupled by a network 740. Alternately or additionally, the first device 710 and the second device 720 may be communicatively coupled by the network 740. In some embodiments, the network 740 may be any network or configuration of networks configured to send and receive communications between systems and devices. In some embodiments, the network 740 may include a conventional type network, a wired or wireless network, and may have numerous different configurations. In some embodiments, the network 740 may also be coupled to or may include portions of a telecommunications network, including telephone lines, for sending data in a variety of different communication protocols, such as a plain old telephone system (POTS).

In some embodiments, the communication system 700 illustrated may be configured to facilitate an assisted call between a hearing-impaired user 702 and a second user 704. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

Alternatively or additionally, the communication system 700 illustrated may be configured to facilitate a call between a person with medical expertise and/or experience and the second user 704. As used in the present disclosure, a "person with medical expertise and/or experience" may be a nurse, doctor, or some other trained medical professional.

In some embodiments, a communication session, such as an audio or a video communication session, may be established between the first device 710 and the second device 720. In one example embodiment, the communication session may be a captioning communication session.

In some embodiments, the system 730 may be an assistive service, which is intended to permit a hearing-impaired person to utilize a communication network and assist their understanding of a conversation by providing text captions to supplement voice conversation occurring during communication sessions with other devices, such as the second device 720. Alternatively or additionally, the system 730 may be an assistive service to couple a person with medical expertise and/or experience with a person requesting medical assistance.

During a communication session, the system 730 and the first device 710 may be communicatively coupled using networking protocols. In some embodiments, during the communication session between the first device 710 and the second device 720, the first device 710 may provide the audio signal from the second device 720 to the system 730.

In some embodiments, at the system 730, a call assistant may listen to the audio signal of the second user 704 and "revoice" the words of the second user 704 to a speech recognition computer program tuned to the voice of the call assistant. In these and other embodiments, the call assistant may be an operator who serves as a human intermediary between the hearing-impaired user 702 and the second user 704. In some embodiments, text captions may be generated by the speech recognition computer as a transcription of the audio signal of the second user 704. The text captions may be provided to the first device 710 being used by the hearing-impaired user 702 over the network 740. The first device 710 may display the text captions while the hearing-impaired user 702 carries on a normal conversation with the second user 704. The text captions may allow the hearing-impaired user 702 to supplement the voice signal received from the second device 720 and confirm his or her understanding of the words spoken by the second user 704.

Modifications, additions, or omissions may be made to the communication system 700 without departing from the scope of the present disclosure. For example, in some embodiments, the second user 704 may be hearing impaired. In these and other embodiments, the system 730 may provide text captions to the second device 720 based on audio data transmitted by the first device 710. Alternately or additionally, the system 730 may include additional functionality. For example, the system 730 may edit the text captions or make other alterations to the text captions after presentation of the text captions on the first device 710.

In some embodiments, the environments 100, 200, and/or 300 of FIGS. 1, 2, and 3, respectively, may be combined with the communication system 700. For example, the communication system 700 may facilitate live verbal captioning of a communication session and the transcription of media files of multimedia messages. For example, in some embodiments, a message with a media file may be sent from the second device 720 to the first device 710. The system 730 may be configured to provide text captions to the media file of the multimedia message along with performing the operations described with respect to FIG. 7.

As indicated above, the embodiments described herein may include the use of a special purpose or general purpose computer (e.g., the processor 410 of FIG. 4) including various computer hardware or software modules, as discussed in greater detail below. Further, as indicated above, embodiments described herein may be implemented using computer-readable media (e.g., the memory 412 or data storage 414 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method to provide transcripts of multimedia messages, the method comprising:
   receiving, at a server system, a message with an attached media file, the message directed to a user device and the server system configured to receive and direct messages to the user device;
   copying, by the server system, the media file from the message before the message is provided to the user device;
   generating a transcript of audio data in the media file using audio data in the copied media file;
   before the generation of the transcript is complete, providing, by the server system, the message with the media file to the user device for presentation of the message on the user device; and
   in response to a request from the user device, providing the transcript to the user device for presentation of the transcript and the media file on the user device.

2. The method of claim 1, wherein the media file includes video data and the audio data.

3. The method of claim 1, further comprising in response to the generation of the transcript, providing to the user device, an indication of the generation of the transcript.

4. The method of claim 3, further comprising obtaining, from the user device, the request for the transcript in response to providing the indication of the generation of the transcript to the user device.

5. The method of claim 4, wherein the user device does not indicate receipt of the message to a user of the user device until after receiving the indication of the generation of the transcript from the server system, wherein the request for the transcript and the media file is sent to the server system from the user device in response to user input at the user device.

6. At least one non-transitory computer readable media configured to store one or more instructions that when executed by a system, which includes the server system, causes or directs the system to perform the method of claim 1.

7. A computer-implemented method to provide transcripts of multimedia messages, the method comprising:
   receiving, at a server system, a message including a media link to a media stream, the message directed to a user device and the server system configured to receive and direct messages to the user device;
   accessing the media stream using the media link;
   obtaining audio data from the media stream;
   generating and storing a transcript of the audio data, wherein the media stream is hosted by a media system separate from the server system that generates and stores the transcript;
   generating a transcript link to the server system that is associated with the transcript of the audio data;
   generating a message link that includes the transcript link and the media link;
   modifying the message to include the message link;
   after modifying the message to include the message link, providing the message to the user device;
   obtaining a request, at the server system from the user device, for the transcript by way of the transcript link, the request occurring in response to the user device accessing the message link, the request not including a request for the media stream; and
   in response to the request, providing the transcript to the user device without the media stream such that the user device presents the transcript along with the media stream obtained by the user device from the media system using the media link.

8. The method of claim 7, wherein the transcript of the audio data is generated using the audio data.

9. The method of claim 7, wherein the media stream includes video data and the audio data.

10. The method of claim 7, further comprising:
    in response to the generation of the transcript of the audio data, providing an indication on the user device of receipt of the message.

11. At least one non-transitory computer readable media configured to store one or more instructions that when executed by at least one computing system causes or directs the least one computing system to perform the method of claim 7.

12. A system to provide transcripts of multimedia messages, the system comprising:
    a processing system configured to:
      receive a message with an attached media file, the message directed to a user device that is separate from the processing system;
      separate the media file from the message;
      after separating the media file from the message, generate a transcript of audio data of the media file using the audio data in the media file;
      before the generation of the transcript is complete, provide the message to the user device;
      after generation of the transcript, provide the media file to the user device separately from the message; and
      after generation of the transcript, provide the transcript to the user device for output of the transcript by the user device.

13. The system of claim 12, wherein the processing system, in response to separation of the media file from the message, is further configured to modify the message to include a media tag to the media file before completion of the transcript.

14. The system of claim 12, wherein the processing system is further configured to:
    in response to the generation of the transcript of the audio data, provide, to the user device, an indication of the generation of the transcript; and
    receive, from the user device, a request for the transcript and the media file,
    wherein the media file is provided to the user device in response to the request from the user device.

15. The system of claim 14, wherein in response to the request from the user device, the transcript is provided to the user device.

16. The system of claim 14, wherein the user device does not indicate receipt of the message to a user of the user device until after receiving the indication of the generation of the transcript from the system, wherein the request for the transcript and the media file is sent to the system from the user device in response to user input at the user device.

17. The system of claim 12, wherein the media file includes video data and the audio data.

\* \* \* \* \*